(12) United States Patent
Iwasaki et al.

(10) Patent No.: US 8,745,333 B2
(45) Date of Patent: *Jun. 3, 2014

(54) SYSTEMS AND METHODS FOR BACKING UP STORAGE VOLUMES IN A STORAGE SYSTEM

(71) Applicant: International Business Machines Corporation, Armonk, NY (US)

(72) Inventors: Norie Iwasaki, Fujisawa (JP); Katsuyoshi Katori, Kawasaki (JP); Hiroyuki Miyoshi, Kawasaki (JP); Takeshi Nohta, Odawara (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,252

(22) Filed: Jun. 18, 2013

(65) Prior Publication Data

US 2013/0282975 A1     Oct. 24, 2013

Related U.S. Application Data

(63) Continuation of application No. 12/953,984, filed on Nov. 24, 2010, now Pat. No. 8,484,419.

(51) Int. Cl.
*G06F 12/00* (2006.01)
*G06F 12/08* (2006.01)
*G06F 11/14* (2006.01)
*G06F 3/06* (2006.01)

(52) U.S. Cl.
CPC ............... *G06F 11/14* (2013.01); *G06F 3/065* (2013.01); *G06F 3/0682* (2013.01)

USPC .................. 711/133; 711/162; 711/E12.001; 711/E12.022; 711/E12.103

(58) Field of Classification Search
None
See application file for complete search history.

(56) References Cited

U.S. PATENT DOCUMENTS

| | | | |
|---|---|---|---|
| 6,041,329 A | 3/2000 | Kishi | |
| 6,269,423 B1 | 7/2001 | Kishi | |
| 6,282,609 B1 | 8/2001 | Carlson | |
| 6,336,172 B1 | 1/2002 | Day, III et al. | |
| 6,336,173 B1 | 1/2002 | Day, III et al. | |
| 6,343,342 B1 | 1/2002 | Carlson | |
| 6,473,829 B1 | 10/2002 | Dahman et al. | |
| 6,718,427 B1 | 4/2004 | Carlson et al. | |
| 6,816,941 B1 | 11/2004 | Carlson et al. | |

(Continued)

FOREIGN PATENT DOCUMENTS

JP     2010-079391     4/2010

*Primary Examiner* — Kevin Verbrugge
(74) *Attorney, Agent, or Firm* — Griffiths & Seaton PLLC (57) ABSTRACT

Systems and methods for backing up storage volumes are provided. One system includes a primary side, a secondary side, and a network coupling the primary and secondary sides. The secondary side includes first and second VTS including a cache and storage tape. The first VTS is configured to store a first portion of a group of storage volumes in its cache and migrate the remaining portion to its storage tape. The second VTS is configured to store the remaining portion of the storage volumes in its cache and migrate the first portion to its storage tape. One method includes receiving multiple storage volumes from a primary side, storing the storage volumes in the cache of the first and second VTS, migrating a portion of the storage volumes from the cache to storage tape in the first VTS, and migrating a remaining portion of the storage volumes from the cache to storage tape in the second VTS.

23 Claims, 2 Drawing Sheets

(56) References Cited

U.S. PATENT DOCUMENTS

| | | |
|---|---|---|
| 6,973,533 B2 | 12/2005 | Dahman et al. |
| 6,983,351 B2 | 1/2006 | Gibble et al. |
| 7,406,580 B2 | 7/2008 | Ashton et al. |
| 7,443,629 B1 | 10/2008 | Ashton et al. |
| 7,633,955 B1 | 12/2009 | Saraiya et al. |
| 7,864,479 B2 | 1/2011 | Ashton et al. |
| 7,877,544 B2 | 1/2011 | Kishi |
| 7,975,100 B2 | 7/2011 | Bish et al. |
| 8,041,921 B2 | 10/2011 | Ashton et al. |
| 8,055,839 B2 | 11/2011 | Kishi et al. |
| 8,341,346 B2 | 12/2012 | Ashton et al. |
| 2005/0015657 A1 | 1/2005 | Sugiura et al. |
| 2005/0050263 A1 | 3/2005 | Ashton et al. |
| 2006/0009645 A1 | 1/2006 | Smith et al. |
| 2006/0248047 A1 | 11/2006 | Grier et al. |
| 2007/0067435 A1 | 3/2007 | Landis et al. |
| 2007/0088917 A1 | 4/2007 | Ranaweera et al. |
| 2008/0244171 A1 | 10/2008 | Ashton et al. |
| 2008/0247077 A1 | 10/2008 | Ashton et al. |
| 2009/0055582 A1 | 2/2009 | Bish et al. |
| 2009/0055583 A1 | 2/2009 | Kishi |
| 2009/0055616 A1 | 2/2009 | Kishi et al. |
| 2009/0077310 A1 | 3/2009 | Ashton et al. |

SYSTEMS AND METHODS FOR BACKING UP STORAGE VOLUMES IN A STORAGE SYSTEM

REFERENCE TO RELATED APPLICATION

This application is a continuation of U.S. patent application Ser. No. 12/953,984, now U.S. Pat. No. 8,484,419, filed on Nov. 24, 2010, the contents of which are incorporated herein by reference.

BACKGROUND OF THE INVENTION

1. Field of the Invention

This invention relates in general to storage systems, and particularly to, systems for backing up storage volumes in a storage system.

2. Description of the Related Art

Mirroring storage volumes stored on a production side to a back-up site is well known in the art. When storage volumes are mirrored, the storage volumes stored on a primary side are transmitted to the back-up side where the storage volumes are then stored on one or more virtual storage tape servers (VTS). The back-up side is used to recover data in the event of a disaster on the primary side or is used when there is maintenance being performed on the primary side.

When a particular storage volume stored on a VTS needs to be accessed by a host residing on the back-up site, the VTS first looks to see if the storage volume is stored in its cache. If the storage volume is in the cache, the storage volume can be quickly retrieved from the cache and transmitted to the host. If the storage volume is not in cache, the storage volume must be retrieved from the storage tape of the VTS prior to transmitting the storage volume to the host, which is much slower than retrieving the storage volume from the cache.

SUMMARY OF THE INVENTION

Various embodiments provide a system for backing up storage volumes. One storage system comprises a primary side comprising one or more virtual storage tape servers (VTS), a secondary side, and a network coupling the primary side and the secondary side. The secondary side comprises a first VTS comprising a first cache and a first storage tape and a second VTS in communication with the first VTS and comprising a second cache and a second storage tape. In one embodiment, the first VTS and the second VTS are configured to store a plurality of storage volumes received from the one or more VTS, the first VTS is configured to store a portion of the plurality of storage volumes in the first cache and to migrate a remaining portion of the plurality of storage volumes to the first storage tape, and the second VTS is configured to store the remaining portion of the plurality of storage volumes in the second cache and to migrate the portion of the plurality of storage volumes in the second storage tape.

Various other embodiments provide methods for backing up storage volumes on a secondary side including a first virtual storage tape server (VTS) comprising a first cache and a first storage tape, and a second VTS in communication with the first VTS and comprising a second cache and a second storage tape. One method comprises receiving, at the secondary side, a plurality of storage volumes from a primary side and storing the plurality of storage volumes in the first cache and the second cache. The method further comprises migrating a portion of the plurality of storage volumes from the first cache to the first storage tape and migrating a remaining portion of the plurality of storage volumes from the second cache to the second storage tape.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for backing up storage volumes on a secondary side including a first virtual storage tape server (VTS) comprising a first cache and a first storage tape, and a second VTS in communication with the first VTS and comprising a second cache and a second storage tape are also provided. One physical computer storage medium comprises computer code for receiving, at the secondary side, a plurality of storage volumes from a primary side and computer code storing the plurality of storage volumes in the first cache and the second cache. The physical computer storage medium further comprises computer code for migrating a portion of the plurality of storage volumes from the first cache to the first storage tape and computer code for migrating a remaining portion of the plurality of storage volumes from the second cache to the second storage tape.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below systems and method for backing up storage volumes. In addition, physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for backing up storage volumes are also provided.

Figure 1:
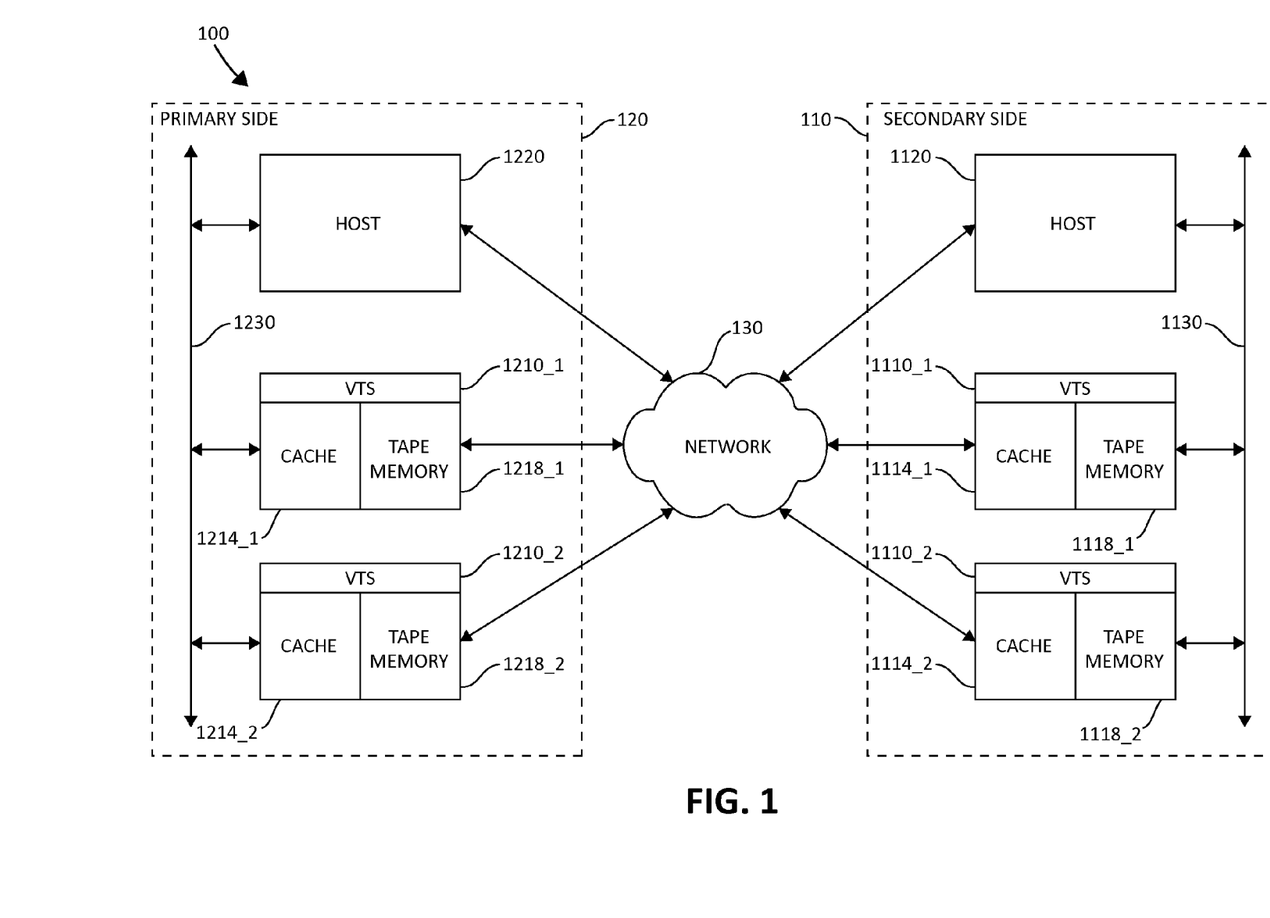
FIG. 1 is a block diagram of one embodiment of a system for backing up storage volumes.

Turning now to the figures, FIG. 1 is a block diagram of one embodiment of a system 100 for backing up storage volumes. At least in the illustrated embodiment, system 100 comprises a back-up side or secondary side 110 and a production side or primary side 120 in communication with one another via a network 130 (e.g., the Internet, a local area network (LAN), a wide area network (WAN), a storage area network (SAN), and/or the like networks).

In one embodiment, secondary side 110 comprises a plurality of virtual storage tape servers 1110 (e.g., VTS 1110_1 and VTS 1110_2) coupled to a host 1120 via a bus 1130 (e.g., a wired and/or wireless bus). As illustrated in FIG. 1, VTS 1110_1 comprises a cache 1114_1 and storage tape 1118_1, and VTS 1110_2 comprises a cache 1114_2 and storage tape 1118_2. VTS 1110_1 and VTS 1110_2 are each configured to store data organized into a plurality storage volumes received from primary side 120.

In one embodiment, VTS 1110_1 and VTS 1110_2, are each configured to store the plurality of storage volumes such that each storage volume is stored in the cache (e.g., cache 1114_1 or cache 1114_2) of one VTS (e.g., VTS 1110_1 or VTS 1110_2) and the storage tape (e.g., storage tape 1118_1 or storage tape 1118_2) of the other VTS (e.g., VTS 1110_1 or VTS 1110_2). To accomplish this, a first portion of the plurality of storage volumes is migrated from the cache to the storage tape in one VTS and the remaining portion of the plurality of storage volumes is migrated from the cache to the storage tape in the other VTS.

For example, a group of storage volumes may be initially stored in cache 1114_1 of VTS 1110_1 and also stored in cache 1114_2 of VTS 1110_2. A first portion of the group of storage volumes may then be migrated from cache 1114_1 to storage tape 1118_1. Furthermore, the remaining portion of the group of storage volumes may then be migrated from cache 1114_2 to storage tape 1118_2. In this manner, each storage volume is stored in the cache (e.g., cache 1114_1 or cache 1114_2) of at least one VTS (e.g., VTS 1110_1 or VTS 1110_2) so that the group of storage volumes may be quickly retrieved from the cache by host 1120 when compared to retrieval from storage tape (e.g., storage tape 1118_1 or storage tape 1118_2). In addition, each storage volume is stored in the storage tape (e.g., storage tape 1118_1 or storage tape 1118_2) of at least one VTS (e.g., VTS 1110_1 or VTS 1110_2) to ensure that the group of storage volumes are mirrored in a different VTS 1110.

In one embodiment, VTS 1110_1 and VTS 1110_2 are each configured to migrate the group of storage volumes in accordance with one of a plurality of storage policies (i.e., the storage policy is at the VTS level). In a first storage policy (e.g., PG0), the storage volumes received by VTS 1110_1 and VTS 1110_2 are migrated from cache 1114_1 to storage tape 1118_1 and from cache 1114_2 to storage tape 1118_2, respectively, in accordance with the size of each storage volume. In one embodiment, the first storage policy migrates the storage volumes from cache 1114_1 to storage tape 1118_1 and/or from cache 1114_2 to storage tape 1118_2 in an order from the largest in size to the smallest in size.

In a second storage policy (e.g., PG1), the storage volumes received by VTS 1110_1 and VTS 1110_2 are migrated consistent with the storage arrangement of the storage volumes on primary side 120. For example, if each of the storage volumes includes a PG0 storage policy on primary side 120, each of the storage volumes will be migrated from cache 1114_1 to storage tape 1118_1 and from cache 1114_2 to storage tape 1118_2, respectively, in accordance with the size of each storage volume.

Similarly, if each of the storage volumes includes a PG1 storage policy on primary side 120, each of the storage volumes will be migrated from cache 1114_1 to storage tape 1118_1 and from cache 1114_2 to storage tape 1118_2, respectively, in accordance with the age or least recently used (LRU) of each storage volume. Here, the storage volumes are migrated from cache 1114_1 to storage tape 1118_1 and/or from cache 1114_2 to storage tape 1118_2 in an order from the least recently used storage volume to the most recently used storage volume.

In the event that one or more storage volumes includes the PG0 storage policy on primary side 120 and one or more storage volumes includes the PG1 storage policy on primary side 120, the PG1 policy of VTS 1110 migrate the storage volumes in a PG0/PG1 order. Specifically, VTS 1110_1 and VTS 1110_2 will migrate the storage volumes from cache 1114_1 to storage tape 1118_1 and from cache 1114_2 to storage tape 1118_2, respectively, in an order where the storage volumes including the PG0 storage policy on primary side 120 will be migrated first in their respective order from the largest in size to the smallest in size. The storage volumes including the PG1 storage policy on primary side 120 will then be migrated in their respective order from the oldest storage volume to the newest storage volume with respect to LRU.

In one embodiment, VTS 1110_1 and VTS 1110_2 use the same storage policy (e.g., PG0 or PG1). In another embodiment, VTS 1110_1 and VTS 1110_2 use different storage policies. For example, VTS 1110_1 may use the PG1 storage policy and VTS 1110_2 may use the PG0 storage policy when determining the order in which to migrate the storage volumes received by VTS 1110_1 and VTS 1110_2. Whether VTS 1110_1 and VTS 1110_2 use the same storage policy or use different migration policies, which storage volumes are to be migrated to cache and which storage volumes are to remain in cache needs to be coordinated between VTS 1110_1 and VTS 1110_2.

VTS 1110_1 and VTS 1110_2 are each configured to communicate with one another (e.g., via bus 1130) to ensure that each storage volume is stored in the cache of one of VTS and in the storage tape of the other VTS. To accomplish this, VTS 1110_1 and VTS 1110_2 are each configured to check with one another to determine if each storage volume has been migrated or is in the process of being migrated to the cache of the other VTS. If the storage volume has not been migrated or is not in the process of being migrated to the storage tape of the other VTS (i.e., remains in the cache of the other VTS), the VTS will begin migrating the storage volume to its own storage tape. If the storage volume has been migrated or is in the process of being migrated to the storage tape of the other VTS, the VTS keeps the storage volume in its cache and moves to the next storage volume in the group of storage volumes in accordance with the storage policy for that particular VTS to check if this storage volume has been migrated or is in the process of being migrated to the storage tape of the other VTS.

For example, if VTS 1110_1 and VTS 1110_2 both use the PG0 storage policy, both VTS 1110_1 and VTS 1110_2 will initially store a group of storage volumes in cache 1114_1 and cache 1114_2, respectively. VTS 1110_1 and VTS 1110_2 will then begin checking with the other VTS in an order from the largest sized storage volume to the smallest sized storage volume to determine if each storage volume has been migrated to the storage tape of the other VTS. Here, VTS 1110_1 will check with VTS 1110_2 to determine if a first storage volume (i.e., the largest storage volume) has been migrated or is in the process of being migrated from cache 1114_2 to storage tape 1118_2. If the first storage volume has not been migrated or is not in the process of being migrated from cache 1114_2 to storage tape 1118_2 (i.e., the first storage volume remains in cache 1114_2), VTS 1110_1 will migrate the first storage volume from cache 1114_1 to storage tape 1114_1. Subsequently, when VTS 1110_2 checks with VTS 1110_1 to determine if the first storage volume has been migrated or is in the process of being migrated from cache 1114_1 to storage tape 1114_1, VTS 1110_2 will receive notice from VTS 1110_2 that the first storage volume has been migrated or is in the process of being migrated to storage tape 1118_1. In response thereto, VTS 1110_2 will continue storing the first storage volume in cache 1114_2 (i.e., will not migrate the first storage volume from cache 1114_2 to storage tape 1118_2). In addition, VTS 1110_2 will attempt to migrate a second storage volume (i.e., the second largest storage volume) in the group of storage volumes from cache 1114_2 to storage tape 1118_2. Similar to above, VTS 1110_2 will check with VTS 1110_1 to determine if the second storage volume has been migrated or is in the process of being migrated from cache 1114_1 to storage tape 1118_1. If the second storage volume has not been migrated or is not in the process of being migrated from cache 1114_1 to storage tape 1118_1 (i.e., the second storage volume is in cache 1114_1), VTS 1110_2 will migrate the second storage volume from cache 1114_2 to storage tape 1118_2. Subsequently, when VTS 1110_1 checks with VTS 1110_2 to determine if the second storage volume has been migrated or is in the process of being migrated from cache 1114_2 to storage tape 1118_2, VTS 1110_1 will receive notice from VTS 1110_2 that the second storage volume has been migrated or is in the process of being migrated from cache 1114_2 to storage tape 1118_2. In response thereto, VTS 1110_1 will continue storing the second storage volume in cache 1114_1 (i.e., will not migrate the second storage volume from cache 1114_1 to storage tape 1118_1). This process is then repeated for each storage volume in the group of storage volumes.

In another example, if VTS 1110_1 and VTS 1110_2 both use the PG1 storage policy, both VTS 1110_1 and VTS 1110_2 will initially store a group of storage volumes in cache 1114_1 and cache 1114_2, respectively. VTS 1110_1 and VTS 1110_2 will then begin checking with the other VTS in the order with which the storage volumes were received from primary side 120.

In the situation where each of the storage volumes include the PG0 storage policy on primary side 120, VTS 1110_1 and VTS 1110_2 will begin checking with the other VTS in an order from the largest sized storage volume to the smallest sized storage volume to determine if each storage volume has been migrated to the storage tape of the other VTS. Here, VTS 1110_1 will check with VTS 1110_2 to determine if a first storage volume (i.e., the largest storage volume) has been migrated or is in the process of being migrated from cache 1114_2 to storage tape 1118_2. If the first storage volume has not been migrated or is not in the process of being migrated from cache 1114_2 to storage tape 1118_2 (i.e., the first storage volume remains in cache 1114_2), VTS 1110_1 will migrate the first storage volume from cache 1114_1 to storage tape 1114_1. Subsequently, when VTS 1110_2 checks with VTS 1110_1 to determine if the first storage volume has been migrated or is in the process of being migrated from cache 1114_1 to storage tape 1114_1, VTS 1110_2 will receive notice from VTS 1110_1 that the first storage volume has been migrated or is in the process of being migrated to storage tape 1118_1. In response thereto, VTS 1110_2 will continue storing the first storage volume in cache 1114_2 (i.e., will not migrate the first storage volume from cache 1114_2 to storage tape 1118_2). In addition, VTS 1110_2 will attempt to migrate a second storage volume (i.e., the second largest storage volume) in the group of storage volumes from cache 1114_2 to storage tape 1118_2. Similar to above, VTS 1110_2 will check with VTS 1110_1 to determine if the second storage volume has been migrated or is in the process of being migrated from cache 1114_1 to storage tape 1118_1. If the second storage volume has not been migrated or is not in the process of being migrated from cache 1114_1 to storage tape 1118_1 (i.e., the second storage volume is in cache 1114_1), VTS 1110_2 will migrate the second storage volume from cache 1114_2 to storage tape 1118_2. Subsequently, when VTS 1110_1 checks with VTS 1110_2 to determine if the second storage volume has been migrated or is in the process of being migrated from cache 1114_2 to storage tape 1118_2, VTS 1110_1 will receive notice from VTS 1110_2 that the second storage volume has been migrated or is in the process of being migrated from cache 1114_2 to storage tape 1118_2. In response thereto, VTS 1110_1 will continue storing the second storage volume in cache 1114_1 (i.e., will not migrate the second storage volume from cache 1114_1 to storage tape 1118_1). This process is then repeated for each storage volume in the group of storage volumes.

In the situation where each of the storage volumes include the PG1 storage policy on primary side 120, VTS 1110_1 and VTS 1110_2 will begin checking with the other VTS in an order from the least recently used (or oldest) storage volume to the most recently used (or newest) storage volume to determine if each storage volume has been migrated to the storage tape of the other VTS. Here, VTS 1110_1 will check with VTS 1110_2 to determine if a first storage volume (i.e., the least recently used storage volume) has been migrated or is in the process of being migrated from cache 1114_2 to storage tape 1118_2. If the first storage volume has not been migrated or is not in the process of being migrated from cache 1114_2 to storage tape 1118_2 (i.e., the first storage volume remains in cache 1114_2), VTS 1110_1 will migrate the first storage volume from cache 1114_1 to storage tape 1114_1. Subsequently, when VTS 1110_2 checks with VTS 1110_1 to determine if the first storage volume has been migrated or is in the process of being migrated from cache 1114_1 to storage tape 1114_1, VTS 1110_2 will receive notice from VTS 1110_1 that the first storage volume has been migrated or is in the process of being migrated to storage tape 1118_1. In response thereto, VTS 1110_2 will continue storing the first storage volume in cache 1114_2 (i.e., will not migrate the first storage volume from cache 1114_2 to storage tape 1118_2). In addition, VTS 1110_2 will attempt to migrate a second storage volume (i.e., the second least recently used storage volume) in the group of storage volumes from cache 1114_2 to storage tape 1118_2. Similar to above, VTS 1110_2 will check with VTS 1110_1 to determine if the second storage volume has been migrated or is in the process of being migrated from cache 1114_1 to storage tape 1118_1. If the second storage volume has not been migrated or is not in the process of being migrated from cache 1114_1 to storage tape 1118_1 (i.e., the second storage volume is in cache 1114_1), VTS 1110_2 will migrate the second storage volume from cache 1114_2 to storage tape 1118_2. Subsequently, when VTS 1110_1 checks with VTS 1110_2 to determine if the second storage volume has been migrated or is in the process of being migrated from cache 1114_2 to storage tape 1118_2, VTS 1110_1 will receive notice from VTS 1110_2 that the second storage volume has been migrated or is in the process of being migrated from cache 1114_2 to storage tape 1118_2. In response thereto, VTS 1110_1 will continue storing the second storage volume in cache 1114_1 (i.e., will not migrate the second storage volume from cache 1114_1 to storage tape 1118_1). This process is then repeated for each storage volume in the group of storage volumes.

Still another example includes VTS 1110_1 using the PG0 storage policy from the largest size to the smallest size and VTS 1110_2 using the PG1 storage policy, which uses the storage policy of each storage volume on primary side 120. Here, VTS 1110_1 will check with VTS 1110_2 to determine if the largest storage volume (e.g., storage volume 5) has been migrated or is in the process of being migrated from cache 1114_2 to storage tape 1118_2. If storage volume 5 has not been migrated or is not in the process of being migrated from cache 1114_2 to storage tape 1118_2 (i.e., storage volume 5 remains in cache 1114_2), VTS 1110_1 will migrate storage volume 5 from cache 1114_1 to storage tape 1118_1.

At substantially the same time, VTS 1110_2 will check with VTS 1110_1 to determine if the largest storage volume, again storage volume 5, has been migrated or is in the process of being migrated from cache 1114_1 to storage tape 1118_1. Since, in this example, storage volume 5 has been migrated or is in the process of being migrated from cache 1114_1 to storage tape 1118_1, VTS 1110_2 will receive notice from VTS 1110_1 that storage volume 5 has been migrated to storage tape 1118_1 or is in the process of being migrated to storage tape 1118_1 and VTS 1110_2 will not migrate storage volume 5 from cache 1114_2 to storage tape 1118_2 (i.e., storage volume 5 will remain in cache 1114_2). VTS 1110_2 will then proceed to the second largest storage volume to determine if the second largest storage volume has been migrated or is in the process of being migrated from cache 1114_1 to storage tape 1118_1 if another storage volumes include the PG0 storage policy on primary side 120 or will then determine if the least recently used storage volume has been migrated or is in the process of being migrated from cache 1114_1 to storage tape 1118_1 when none of the remaining storage volumes include the PG0 storage policy on primary side 120 or all of the remaining storage volumes include the PG1 storage policy on primary side 120 (hereafter, storage volume 0 either situation). If storage volume 0 has not been migrated or is not in the process of being migrated from cache 1114_1 to storage tape 1118_1 (i.e., storage volume 0 remains in cache 1114_1), VTS 1110_2 will migrate storage volume 0 from cache 1114_2 to storage tape 1118_2.

Subsequently, when VTS 1110_1 checks with VTS 1110_2 to determine if storage volume 0 has been migrated or is in the process of being migrated from cache 1114_2 storage tape 1118_2 (i.e., after VTS 1110_1 has attempted to migrate each storage volume that is larger in size than the storage volume, if any), VTS 1110_1 will receive notice from VTS 1110_2 that storage volume 0 has been migrated to storage tape 1118_2. In response thereto, VTS 1110_1 will continue to store storage volume 0 in cache 1114_1 (i.e., will not migrate storage volume 0 from cache 1114_1 to storage tape 1118_1) and continue the process by checking with VTS 1110_2 to determine if the next largest storage volume has been migrated or is in the process of being migrated from cache 1114_2 to storage volume 1118_2. This process is then repeated for each storage volume in the group of storage volumes.

Host 1120 may be any host computing system and/or device known in the art or developed in the future. In one embodiment, when host 1120 desires to read data from and/or write data to a storage volume stored in secondary side 110, host 1120 is configured to obtain the storage volume from the cache (i.e., cache 1114_1 or cache 1114_2) that is storing the storage volume. If the storage volume is for some reason unavailable in cache 1114_1 or cache 1114_2, host 1120 will obtain the storage volume from the storage tape (i.e., storage tape 1118_1 or storage tape 1118_2) that is storing the storage volume. In this manner, each storage volume is mirrored in a storage tape on secondary side 110 and is more quickly retrievable than previous systems and methods because the storage volume is in cache 1114_1 or cache 1114_2.

Although FIG. 1 illustrates secondary side as having VTS 1110_1 and VTS 1110_2, various other embodiments provide a secondary side 110 that includes more than two VTS 110. That is, various other embodiments include the storage volumes being divided amongst and stored in the cache and storage tape of three or more VTS 1110 such that each storage volume is simultaneously stored in at least one cache and at least one storage tape.

Primary side 120 includes one or more VTS 1210 coupled to a host 1220 via bus 1230 (e.g., a wired and/or wireless bus). In the illustrated embodiment, primary side 120 comprises a VTS 1210_1 including a cache 1214_1 and a storage tape 1218_1, and a VTS 1210_2 including a cache 1214_2 and a storage tape 1218_2.

VTS 1210_1 and VTS 1210_2 are each configured to receive commands from host 1220 to read data from and write data to storage volumes stored in cache 1214_1/storage tape 1218_1 or cache 1214_2/storage tape 1218_2, respectively. VTS 1210_1 and VTS 1210_2 are each further configured to transmit storage volumes between themselves when data is written to VTS 1210_1 and VTS 1210_2 such that the storage volumes stored in VTS 1210_1 and VTS 1210_2 are backed-up or mirrored in VTS 1210_1 and VTS 1210_2, which mirroring occurs synchronously.

In one embodiment, each storage volume includes a PG0 storage policy or a PG1 storage policy on primary side 120 (i.e., the storage policy on primary side 120 is at the storage volume level). In this embodiment, storage volumes including the PG0 storage policy do not need to be stored in cache 1214_1 or cache 1214_2 because, for example, data will not soon be read from and/or written to these storage volumes on primary side 120. Storage volumes including the PG1 storage policy need to be stored in cache 1214_1 and/or cache 1214_2 because, for example, data will soon be read from and/or written to these storage volumes on primary side 120.

Furthermore, VTS 1210_1 and VTS 1210 are each configured to replicate the storage volumes on secondary side 110 when data is written to VTS 1210_1 and VTS 1210_2. That is, VTS 1210_1 and VTS 1210_2 are each configured to replicate the storage volumes on both VTS 1110_1 and VTS 1110_2 when storage volumes stored in VTS 1210_1 and 1210_2 need to be backed-up or mirrored, which mirroring occurs asynchronously with respect to the back-up or mirroring that occurs between VTS 1210_1 and VTS 1210_2.

In one embodiment, primary side 120 is configured in the same manner as secondary side 110 discussed above such that each storage volume stored on primary side 120 is stored in the cache of VTS 1210_1 or VTS 1210_2 and stored in the storage tape of the other of VTS 1210_1 or VTS 1210_2. In this manner, primary side 120 can also operate as a back-up side to secondary side 110 and secondary side 110 can operate as a production side of primary side 120.

Figure 2:
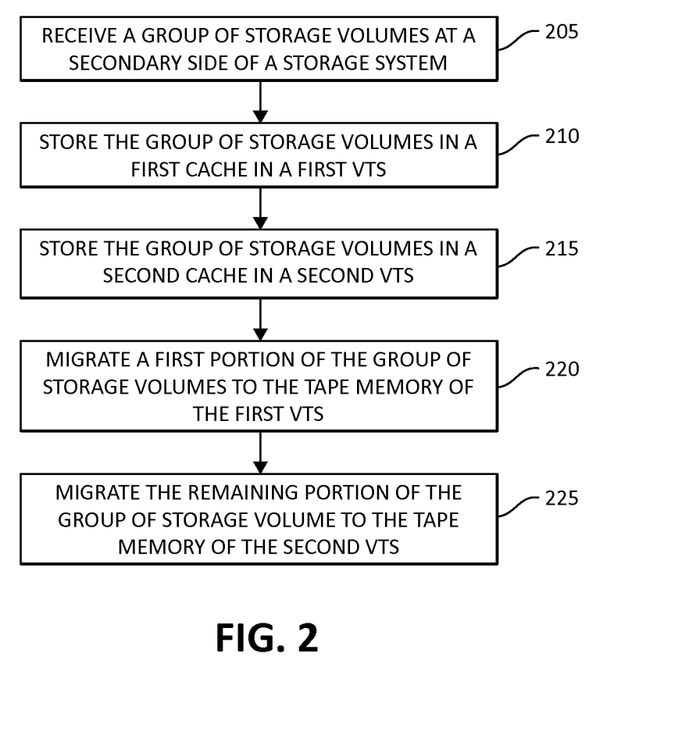
FIG. 2 is a flow diagram of one embodiment of a method for backing up storage volumes.

Turning now to FIG. 2, FIG. 2 is a flow diagram of one embodiment of a method 200 for backing up storage volumes. At least in the illustrated embodiment, method 200 begins by receiving from a primary side (e.g., primary side 120) a group of storage volumes at a first VTS (e.g., VTS 1110_1) and a second VTS (e.g., VTS 1110_2) on secondary side (e.g., secondary side 110) (block 205).

Method 200 further comprises storing the group of storage volumes in a first cache (e.g., cache 1114_1) of the first VTS (block 210) and storing the group of storage volumes in a second cache (e.g., cache 1114_2) of the second VTS (block 215). A first portion of the group of storage volumes are migrated from the first cache to a first storage tape (e.g., storage tape 1118_1) in the first VTS while a remaining portion of the group of storage volume continues to be stored in the first cache (block 220). The remaining portion of the group of storage volumes are migrated from the second cache to a second storage tape (e.g., storage tape 1118_1) in the second VTS while the first portion of the group of storage volume continues to be stored in the second cache (block 225). In this manner, each storage volume is stored in the cache of one VTS and the storage tape of the other VTS.

In one embodiment, the first portion of the group of storage volumes is migrated from the first cache to the first storage tape in accordance with a first storage policy (e.g., PG0 or PG1) and the remaining portion of the group of storage volumes is migrated from the second cache to the second storage tape in accordance with a second storage policy (e.g., PG0 or PG1). In one aspect of this embodiment, the first storage policy and the second storage policy are both the PG0 storage policy discussed above. In another aspect of this embodiment, the first storage policy and the second storage policy are both the PG1 storage policy discussed above. In still another aspect of this embodiment, the first storage policy is the PG0 storage policy discussed above and the second storage policy is the PG1 storage policy discussed above. In yet another aspect of this embodiment, the first storage policy is the PG1 storage policy discussed above and the second storage policy is the PG0 storage policy discussed above.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A storage system for backing up storage volumes, the storage system comprising:
a first virtual storage tape server (VTS) comprising a first cache and a first storage tape; and
a second VTS in communication with the first VTS and comprising a second cache and a second storage tape, wherein:
the first VTS is configured for storing a portion of a plurality of storage volumes in the first cache and for migrating a remaining portion of the plurality of storage volumes to the first storage tape, and
the second VTS is configured for storing the remaining portion of the plurality of storage volumes in the second cache and for migrating the portion of the plurality of storage volumes in the second storage tape.

2. The storage system of claim 1, wherein:
the first VTS is configured for migrating the remaining portion of the plurality of storage volumes to the first storage tape in accordance with a first storage policy; and
the second VTS is configured for migrating the portion of the plurality of storage volumes to the first storage tape in accordance with a second storage policy.

3. The storage system of claim 2, wherein the first storage policy and the second storage policy are a same storage policy.

4. The storage system of claim 3, wherein:
the first storage policy comprises migrating the portion of the plurality of storage volumes from the first cache to the first storage tape in a first least recently used (LRU) order for the portion; and
the second storage policy comprises migrating the remaining portion of the plurality of storage volumes from the second cache to the second storage tape in a second LRU order for the remaining portion.

5. The storage system of claim 3, wherein:
the first storage policy comprises migrating the portion of the plurality of storage volumes from the first cache to the first storage tape in an order based on a first size of each storage volume in the first portion; and
the second storage policy comprises migrating the portion of the plurality of storage volumes from the second cache to the second storage tape in an order based on a second size of each storage volume in the remaining portion.

6. The storage system of claim 2, wherein the first storage policy and the second storage policy are different storage policies.

7. The storage system of claim 6, wherein:
the first storage policy comprises migrating the portion of the plurality of storage volumes from the first cache to the first storage tape in an order based on a size of each storage volume in the portion, and
the second storage policy comprises migrating the portion of the plurality of storage volumes from the second cache to the second storage tape in a least recently used (LRU) order for the remaining portion.

8. A computer storage memory comprising a computer program product for backing up storage volumes on a first virtual storage tape server (VTS) comprising a first cache and a first storage tape and on a second VTS in communication with the first VTS and comprising a second cache and a second storage tape, the computer storage memory comprising:
computer code for storing a plurality of storage volumes in the first cache and the second cache;
computer code for migrating a portion of the plurality of storage volumes from the first cache to the first storage tape; and
computer code for migrating a remaining portion of the plurality of storage volumes from the second cache to the second storage tape.

9. The computer storage memory of claim 8, further comprising:
computer code for storing the remaining portion of the plurality of storage volumes in the first cache; and
computer code for storing the portion of the plurality of storage volumes in the second cache such that all of the plurality of storage volumes are stored in the first cache and the second cache.

10. The computer storage memory of claim 8, wherein:
computer code for migrating the portion of the plurality of storage volumes from the first cache to the first storage tape comprises migrating the portion of the plurality of storage volumes from the first cache to the first storage tape in accordance with a first storage policy; and
computer code for migrating the remaining portion of the plurality of storage volumes from the second cache to the second storage tape comprises migrating the remaining portion of the plurality of storage volumes from the second cache to the second storage tape in accordance with a second storage policy.

11. The computer storage memory of claim 10, wherein the first storage policy and the second storage policy are a same storage policy.

12. The computer storage memory of claim 11, wherein:
the computer code for migrating the portion of the plurality of storage volumes from the first cache to the first storage tape comprises computer code for migrating the portion of the plurality of storage volumes from the first cache to the first storage tape in a least recently used (LRU) order; and
the computer code for migrating the remaining portion of the plurality of storage volumes from the second cache to the second storage tape comprises computer code for migrating the remaining portion of the plurality of storage volumes from the second cache to the second storage tape in the LRU order.

13. The computer storage memory of claim 11, wherein:
the computer code for migrating the portion of the plurality of storage volumes from the first cache to the first storage tape comprises computer code for migrating the portion of the plurality of storage volumes from the first cache to the first storage tape in an order based on the size of each storage volume; and
the computer code for migrating the remaining portion of the plurality of storage volumes from the second cache to the second storage tape comprises computer code for migrating the remaining portion of the plurality of storage volumes from the second cache to the second storage tape in the order based on the size of each storage volume.

14. The computer storage memory of claim 10, wherein the first storage policy and the second storage policy are different storage policies.

15. The computer storage memory of claim 14, wherein:
the computer code for migrating the portion of the plurality of storage volumes from the first cache to the first storage tape comprises computer code for migrating the portion of the plurality of storage volumes from the first cache to the first storage tape in a least recently used (LRU) order; and
the computer code for migrating the remaining portion of the plurality of storage volumes from the second cache to the second storage tape comprises computer code for migrating the remaining portion of the plurality of storage volumes from the second cache to the second storage tape in an order based on the size of each storage volume.

16. A method for backing up storage volumes on a first virtual storage tape server (VTS) comprising a first cache and a first storage tape and on a second VTS in communication with the first VTS and comprising a second cache and a second storage tape, the method comprising:
storing the plurality of storage volumes in the first cache and the second cache;
migrating a portion of the plurality of storage volumes from the first cache to the first storage tape; and
migrating a remaining portion of the plurality of storage volumes from the second cache to the second storage tape.

17. The method of claim 16, further comprising:
storing the remaining portion of the plurality of storage volumes in the first cache; and
storing the portion of the plurality of storage volumes in the second cache such that all of the plurality of storage volumes are stored in the first cache and the second cache.

18. The method of claim 16, wherein:
migrating the portion of the plurality of storage volumes from the first cache to the first storage tape comprises migrating the portion of the plurality of storage volumes from the first cache to the first storage tape in accordance with a first storage policy; and
migrating the remaining portion of the plurality of storage volumes from the second cache to the second storage tape comprises migrating the remaining portion of the plurality of storage volumes from the second cache to the second storage tape in accordance with a second storage policy.

19. The method of claim 18, wherein the first storage policy and the second storage policy are a same storage policy.

20. The method of claim 19, wherein:
migrating the portion of the plurality of storage volumes from the first cache to the first storage tape comprises migrating the portion of the plurality of storage volumes from the first cache to the first storage tape in a least recently used (LRU) order; and
migrating the remaining portion of the plurality of storage volumes from the second cache to the second storage tape comprises migrating the remaining portion of the plurality of storage volumes from the second cache to the second storage tape in the LRU order.

21. The method of claim 19, wherein:
migrating the portion of the plurality of storage volumes from the first cache to the first storage tape comprises migrating the portion of the plurality of storage volumes from the first cache to the first storage tape in an order based on the size of each storage volume; and
migrating the remaining portion of the plurality of storage volumes from the second cache to the second storage tape comprises migrating the remaining portion of the plurality of storage volumes from the second cache to the second storage tape in the order based on the size of each storage volume.

22. The method of claim 18, wherein the first storage policy and the second storage policy are different storage policies.

23. The method of claim 22, wherein:
migrating the portion of the plurality of storage volumes from the first cache to the first storage tape comprises migrating the portion of the plurality of storage volumes from the first cache to the first storage tape in a least recently used (LRU) order; and
migrating the remaining portion of the plurality of storage volumes from the second cache to the second storage tape comprises migrating the remaining portion of the plurality of storage volumes from the second cache to the second storage tape in an order based on the size of each storage volume.

* * * * *